March 1, 1938. N. TRBOJEVICH 2,109,937
SHAFT OR BEAM
Filed May 24, 1937
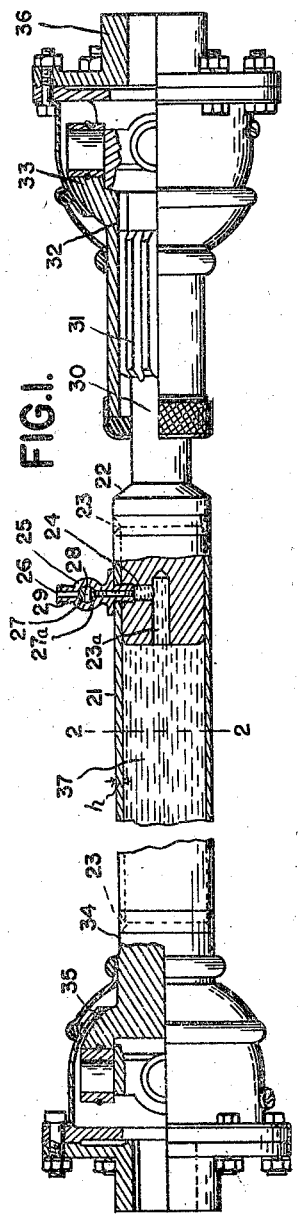
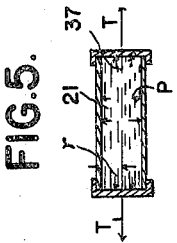
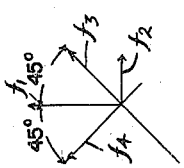
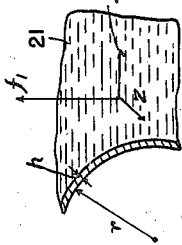
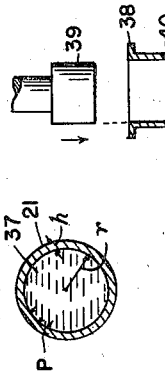
INVENTOR
NIKOLA TRBOJEVICH
BY
Whittemore Hulbert + Belknap
ATTORNEYS Patented Mar. 1, 1938

2,109,937

UNITED STATES PATENT OFFICE 2,109,937

SHAFT OR BEAM

Nikola Trbojevich, Detroit, Mich.

Application May 24, 1937, Serial No. 144,556

8 Claims. (Cl. 64—1)

The invention relates to an improvement in rotary shafts of the hollow circular cross section type. In particular, my invention is best adapted to shafts that carry a moderate torque at high rotative speeds; e. g. the automobile propeller shafts in which the centrifugal whipping is to be avoided by all means on account of the attendant noise, danger of breaking and the possible damage to the universal joints.

In a broader aspect, the theoretical principles herein presented are applicable to a variety of shafting and even to stationary beams.

In a shaft of the indicated type the greatest efficiency is obtained when the thickness of the wall is the least in comparison with the diameter of the shaft. However, heretofore it was not possible to sufficiently reduce the said wall thickness on account of the possibility of buckling and crumpling of the side walls of the tube under load. I conceived the idea of filling the cavity with an incompressible fluid in order to preserve the circular cross section under bending as well as under torsion.

In the principal modification of my invention I go one step further in that I entrap the fluid under an initial predetermined pressure, thus creating a tensile force acting in the direction of the axis. This improvement is particularly valuable in counteracting the centrifugal whip and in raising the critical speed of the shaft to a marked degree.

The objects of this invention are hence: to save on the amount of steel required and to produce a safer, quieter, and more scientific shaft.

In the drawing:

Figure 1 shows the principal cross section of my improved shaft and also shows the method of attaching the same to two universal joints of the commercial type;

Figure 2 is a cross section of the tube shown in Figure 1 in the plane 2—2;

Figure 3 diagrammatically shows an alternate method of filling the tube with fluid at a pressure;

Figures 4, 4a and 5 are geometrical diagrams explaining the stresses generated by the hydrostatic pressure;

Figures 6 and 7 are similar diagrams explanatory of the stresses under torsion;

Figures 8 and 9 are diagrams explanatory of the stresses under bending;

Figure 10 shows a modification of my improved shaft in which the tube is sheathed in a protective covering.

I shall first describe the construction of the new shaft and then I shall briefly discuss the nature and distribution of the stresses.

1.—The shaft

As shown in Figures 1 and 2, the shaft 21 is a hollow cylindrical tube having a mean radius ($r$) and a (comparatively slight) thickness of wall ($h$). At the right end of the said tube, which is the portion nearest to the engine, a solid shaft 22 is press-fitted into the tube and the end of the tube is hammered down in the V-shaped slot 23 for additional security. In the center of the said shank 22 a hole 23a and at right angles thereto another hole 24 are drilled. The tap or valve 25 is screwed into the end of the last named hole 24 and is provided with two holes, one vertical hole 26 communicating with the above mentioned hole 24 and a conical horizontal hole 27 rotatably supporting the plunger 27a, the latter being provided with a transverse hole 28 capable of registering with the hole 26. A screw thread 29 is provided at the top of the valve 25 for the purpose of making a connection with a pump or accumulator when filling the tube with fluid 37 under pressure.

The right-hand end of the solid shaft 22 is formed into a shank 30 of a lesser diameter and is provided with a plurality of splines 31 slidably fitting into the corresponding splined bore 32 of the universal joint 33.

The left end of the tube 21 is press-fitted in a similar manner over the shank 34 of the universal joint 35 nearest to the rear axle. The joints 33 and 35 need not be described here in detail as their construction is not a part of this invention beyond the fact that they are hooked up to the shaft.

The two ends of the tube 21 are preferably welded to the corresponding shanks 22 and 24 previous to the injection of the fluid. Also, the valve 25 may be fused or welded together after the fluid has attained the required pressure and broken off or filed off as it will be no longer needed during the life of the shaft providing all joints are made fully fluid-tight.

In Figure 3 another method of charging the tube 21 with fluid 37 is diagrammatically shown. The tube is provided with a rim 38 for the purpose of holding it in a suitable die, and a tight fitting plunger 39 is rammed down into the tube. An air hole 40 is provided for the escape of air near the surface of the fluid. The pressure in the liquid may be gaged by accurate measurements of the bulging of tube diameter and the downward stroke of the plunger 39 may then be accordingly adjusted.

The fluid 37 may be any one of the various available substances which are sufficiently plastic to transmit a hydrostatic pressure and which will not boil or freeze within the temperature range and are in addition cheap, light and homogeneous. Oil, vaseline, tar, asphaltum, etc. are among the best suited substances, although my invention is not limited thereto.

2.—Stresses in the tube wall

When the thin-walled tube 21 of a radius $r$ and wall thickness $h$ is subjected to an internal fluid pressure $p$, the three principal stresses are as in Figure 4:

$$f_1 = \frac{pr}{h} \text{ (tensile)} \tag{1}$$

$$f_2 = \frac{pr}{2h} \text{ (tensile)} \tag{2}$$

$$z = p \text{ (compressive)} \tag{3}$$

The hoop stress $f_1$ is twice as great as the longitudinal tensile stress $f_2$, while $z$ is comparatively negligible.

Of particular interest are the stresses $f_3$ and $f_4$ in the direction of 45° relative to $f_1$ and $f_2$, Figure 4a $$f_3 = f_4 = \frac{f_1 + f_2}{2} = \frac{3}{4} f_1 \tag{4}$$

and the tensile forces at the ends of cylinder, Figure 5 are $$T = r^2 \pi p \tag{5}$$

There are also some shearing stresses in the 45° planes but are negligible as they do not exceed one fourth of $f_1$ in value.

When the tube 21 is taken under torsion by means of the moment $M_1$, two equal shearing stresses $t$ are generated at right angles to each other as shown in Figure 6, the value of $t$ being $$t = \frac{M_1 r}{I_2} \tag{6}$$

where $I_1$ is the polar inertia moment of the cross section. These two shearing stresses are equivalent to a tensile stress $f_5$ and a compressive stress $c_1$, each being equal in absolute value to $t$ and operating at right angles to each other in 45° helices, Figure 7. I superpose now the stresses $f_3$ and $f_4$, Figure 4a, over the stresses $c_1$ and $f_5$, Figure 7, and add. The resulting compressive stress $c_2$ $$c_2 = c_1 - f_3 = t - f_3 \tag{7}$$

and the resulting tensile stress $f_6$ will be, $$f_6 = f_5 + f_3 = t + f_3 \tag{8}$$

In the Equation 7 I have now means at my disposal for diminishing the compressive stress $c_1$ at will and even for eliminating it altogether. The price of doing this is paid by the increase of the tensile stress $f_5$ to $f_6$ in the same amount, Equation 8. I shall presently show the amount of practical gain resulting from this procedure.

In bending, somewhat similar conditions prevail. As shown in Figure 8, the tube 21 is bent by means of the moments $M_2$ into a circular arc of a radius R. A compressive stress $c_3$ in the inner fibre and a tensile stress $f_6$ equal in magnitude in the outer fibre are generated to the extent of:

$$f_6 = -c_3 = \frac{M_2 r}{I_2} \tag{9}$$

where $I_2$ is the inertia moment, equal to one-half of the above mentioned polar moment $I_1$.

The compressive stress $c_3$ will now be reduced and the tensile stress $f_6$ increased by the subtraction and addition respectively of the stress $f_2$, Figure 4. The resulting stresses $f_7$ and $c_4$ will now be:

$$f_7 = f_6 + f_2 \tag{10}$$

$$c_4 = c_3 - f_2 \tag{11}$$

that is, the compressive stress $c_3$ Equation 11, is readily reducible by increasing the hydrostatic pressure $p_1$, Equation 2.

3.—The preservation of the circular cross section

Were it not for the entrapped fluid 37 in the tube 21, Figure 2, the thin-walled circular cross section would collapse into an elliptic form long before the elastic limit of material were reached both in bending and torsion.

The great difficulty in this phenomenon of collapse is that the process is cumulative and self-generating, i. e. the successive deformations recur at less stressing.

The forces that might cause a collapse in bending are shown in Figure 8. The resultant of the compressive stresses $c_3$ in the lower fibre is the upward pointing force $N_1$ and the resultant of the tensions $f_6$ is the downward pointing force $N_2$. The two forces together will flatten out an empty tube.

In torsion, mathematically speaking, the circular cross section would be preserved even without the presence of entrapped fluid if the shaft were perfectly straight and the stress distribution uniform all around the circle. However, a stress concentration at a point may occur accidentally, or through misalignment, or through bending, and a flattening will progressively occur.

In the new shaft such flattening may occur only to a limited degree and not progressively. The volume of the entrapped fluid is constant and a change from a circular to an elliptic cross sectional contour may occur only when accompanied by a corresponding elongation of the wall fibres which is very little. On the other hand, an empty tube may be flattened out without an elongation of the wall fibres.

4.—Centrifugal whirling

The following quotation is taken from the book by Andrews entitled "Strength of Materials", published in London in 1925, pages 562 to 569:

If a shaft rotates at high speed, the lack of mathematically exact balancing results in an eccentricity of load which causes centrifugal forces to be induced and these centrifugal forces will cause deflections which increase the eccentricity; this increased eccentricity causes further deflection and so on, the deflection increasing indefinitely and giving rise to whirling at certain speeds called critical speeds.

Let C be the centrifugal force, Figure 9, L the length of shaft, $y$ the deflection, $y_0$ the distance of the momentary center of gravity from the X axis, G the weight of the shaft, $g$ the gravity constant, $u$ the angular velocity, E the elastic modulus. Then we have:

$$C = \frac{G}{g} u^2 y_0 \tag{12}$$

$$y = \frac{CL^3}{48EI_2} \tag{13}$$

and the maximum bending moment $M_3$ at the point B $$M_3 = \frac{CL}{4} \tag{14}$$

If I now assume for a certain limited range that $y_0 = ky$, where $k$ is constant less than unity, it is readily seen from the Equations 12 to 14 that the centrifugal moment $M_3$ increases with the fourth power of the span $L$, with the square of angular velocity and linearly with the weight of shaft and the deflection. In a state of equilibrium this centrifugal moment is opposed in shafts as heretofore constructed by the rigidity of the shaft cross section alone expressed as the product $EI_2$. However, in the new shaft there is an additional restoring moment $M_4$, see Figure 9.

$$M_4 = Ty \qquad (15)$$

From this it follows that the total restoring moment is by an amount $M_4$ greater than formerly and the deflection correspondingly less.

Without going further into this very complicated theory, I merely remark as a guidance to the designer that an eccentrically whirling shaft is comparable to a spring undergoing a transverse vibration. The frequency of such a spring is proportional to the square root of the restoring force divided by the weight. In my new shaft I increase the weight somewhat by adding the fluid but I more than compensate for that increase by first using a more efficient cross section (less thickness of wall) and second, by adding the corrective moment $Ty$. The tensile forces $T$ at the two ends of the shaft make the shaft perform as if it were fixed at both ends. A full and perfect fixation of the shaft ends would increase the critical speed 900%, see Andrews, page 568, so there is considerable to gain even from an imperfect fixation of the ends as obtained in the new construction.

5.—A modification in wall construction

For extremely fast running shafts I employ the construction shown in Figure 10. The shaft 21 filled with fluid 37 under a hydrostatic pressure $p$ is of the same type as shown in Figure 1. A sheath or armor 41 composed of metallic or textile threads is tightly spun or woven at the outer circumference of the shaft in very much the same fashion as the marine cables are armored. The physical properties of the sheath 41 are such that the sheath will offer no resistance to axial stretching, bending or twist, but will resist the radial expansion of the shaft caused by the fluid pressure. By an accurate calculation and method of manufacture, I strive to reduce the hoop stress $f_1$, Equation 1, to one-half of its former value, i. e. I make it equal to $f_2$, Equation 2. In this manner I may increase the permissible fluid pressure and also the end tension $T$ 100%.

The best material for the new shaft is a mechanically hardened, i. e. repeatedly cold drawn, steel. In all cases I carefully calculate the fluid pressures on the basis of the Equations 1 to 15, in order to obtain the greatest possible torsional and flexural rigidity within the permissible stress limits.

What I claim as my invention is:

1. A shaft or beam comprising a thin shell of high tensile strength disposed about an axis and enclosed all around and at both ends and a plastic substance possessing no tensile strength filling out the cavity in the said shell under an initial pressure, said pressure being predetermined with the object in view of creating a negative bending moment to oppose any other bending moment perpendicular to the axis and thus to minimize the amount of deflection.

2. The combination of a driving member, a driven member, a shell connecting said members and a plastic material under pressure within said shell.

3. A shaft or beam comprising a thin cylindrical shell of high tensile strength disposed about an axis and closed at both ends and a plastic substance completely filling out the cavity in the said shell.

4. A shaft or beam comprising a thin cylindrical shell of high tensile strength disposed about an axis and closed at both ends and a plastic substance completely filling out the cavity in the said shell, and possessing a predetermined initial pressure.

5. A shaft or beam comprising a thin cylindrical shell of high tensile strength of a circular ring cross section disposed about an axis and closed at both ends and a plastic substance completely filling out the cavity in the said shell.

6. A shaft or beam comprising a thin cylindrical shell of high tensile strength of a circular ring cross section disposed about an axis and closed at both ends and a plastic substance completely filling out the cavity in the said shell and possessing a predetermined initial pressure.

7. A propeller shaft for vehicles comprising a thin shell of a circular ring cross section and high tensile strength disposed about an axis and enclosed at both ends, a plastic matter completely filling out the cavity in the said shell and possessing an initial pressure, one end of the said shaft being formed to slidably engage a universal joint.

8. A shaft or beam comprising a thin cylindrical shell of high tensile strength disposed about an axis, closed all around and at both ends, a plastic substance filling the cavity under a predetermined initial pressure, and a sheath or armor on the outside of the said shell capable of resisting an internal pressure in the planes perpendicular to the axis but non-resistant with respect to forces acting in the direction parallel to the axis.

NIKOLA TRBOJEVICH.